(12) United States Patent
Li

(10) Patent No.: US 11,989,368 B2
(45) Date of Patent: May 21, 2024

(54) DISPLAY PANEL AND DISPLAY DEVICE

(71) Applicant: Xiamen Tianma Display Technology Co., Ltd., Xiamen (CN)

(72) Inventor: Jiaxin Li, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/953,370

(22) Filed: Sep. 27, 2022

(65) Prior Publication Data
US 2023/0409139 A1 Dec. 21, 2023

(30) Foreign Application Priority Data
Jun. 20, 2022 (CN) .......................... 202210696147.3

(51) Int. Cl.
*G06F 3/041* (2006.01)
*G06F 3/042* (2006.01)
*G06F 3/044* (2006.01)

(52) U.S. Cl.
CPC ........ *G06F 3/04164* (2019.05); *G06F 3/0412* (2013.01); *G06F 3/0421* (2013.01); *G06F 3/0445* (2019.05); *G06F 3/0446* (2019.05)

(58) Field of Classification Search
CPC .. G06F 3/04164; G06F 3/0445; G06F 3/0446; G06F 3/0412; G06F 3/0421
See application file for complete search history.

(56) References Cited

U.S. PATENT DOCUMENTS

| | | | |
|---|---|---|---|
| 2017/0075481 A1* | 3/2017 | Chou | ...................... G06F 1/163 |
| 2018/0053810 A1* | 2/2018 | Jin | ......................... G06F 3/0412 |
| 2018/0329552 A1* | 11/2018 | Song | ...................... G06F 3/0416 |

* cited by examiner

*Primary Examiner* — Lisa S Landis
(74) *Attorney, Agent, or Firm* — East IP P.C.

(57) ABSTRACT

The present application provides a display panel and a display device. The display panel include a display region and a non-display region arranged adjacently. The display panel including: a substrate; a touch layer located in the display region and arranged on a side of the substrate, wherein the touch layer includes one or more first touch electrodes extending along a first direction and arranged along a second direction and one or more second touch electrodes extending along the second direction and arranged along the first direction; a touch signal line including a first touch trace and a second touch trace, wherein the first touch trace is electrically connected to the first touch electrodes, and the second touch trace is electrically connected to the second touch electrodes; wherein at least one of the first touch trace and the second touch trace is located in the display region.

17 Claims, 10 Drawing Sheets

DISPLAY PANEL AND DISPLAY DEVICE

CROSS-REFERENCE TO RELATED APPLICATION

This application claims priority to Chinese Patent Application No. 202210696147.3, filed on Jun. 20, 2022, which is incorporated herein by reference in its entirety.

TECHNICAL FIELD

The present application relates to a technical field of electronic products, and particularly relates to a display panel and a display device.

BACKGROUND

In recent years, touch technology has been widely used in display devices of various sizes. Since a touch display panel is a new type of display panel for human-computer interaction input, the touch input method of the touch display panel is simpler, more direct and more convenient (compared to the traditional input methods of a display, a keyboard, and a mouse).

In order to implement touch functions of the display panel, touch electrodes need to be introduced into the display panel and a touch signal may be sent to the touch electrodes through a touch signal line. Being limited by an existing wiring layout of the display panel, the touch signal line affects the frame width of the display panel, which causes an excessively large frame width, and affects user experience.

Therefore, there is an urgent need for a new display panel and a new display device.

SUMMARY

Embodiments of the present application provide a display panel and a display device.

In a first aspect, embodiments of the present application provide a display panel including a display region and a non-display region arranged adjacently. The display panel including: a substrate; a touch layer located in the display region and arranged on a side of the substrate, wherein the touch layer includes one or more first touch electrodes extending along a first direction and arranged along a second direction and one or more second touch electrodes extending along the second direction and arranged along the first direction; a touch signal line including a first touch trace and a second touch trace, wherein the first touch trace is electrically connected to the first touch electrodes, and the second touch trace is electrically connected to the second touch electrodes; wherein at least one of the first touch trace and the second touch trace is located in the display region.

In a second aspect, an embodiment of the present application provides a display device including the display panel according any one of the above embodiments.

BRIEF DESCRIPTION OF THE DRAWINGS

In order to illustrate technical solutions of embodiments of the present application more clearly, the drawings required for the embodiments of the present application will be briefly described. Obviously, the drawings described below are only some embodiments of the present application. For a person skilled in the art, other drawings can also be obtained from these drawings without any inventive effort.

DETAILED DESCRIPTION

The features and exemplary embodiments of various aspects of the present application will be described in detail below. In the following detailed description, numerous specific details are presented to provide a thorough understanding of the present application. However, it will be apparent to a person skilled in the art that the present application may be practiced without some of these specific details. The following description of the embodiments is merely to provide a better understanding of the present application by illustrating examples of the present application.

It should be noted that, in this document, relational terms such as first and second are used only to distinguish one entity or operation from another entity or operation, and do not necessarily require or imply such actual relationship or sequence between these entities or operations. Moreover, the terms "comprising", "including" or any other variation thereof are intended to encompass a non-exclusive inclusion, such that a process, method, article or device that includes a list of elements includes not only those elements, but also includes other elements that are not explicitly listed but inherent to such a process, method, article or device. Without further limitation, an element defined by the term "comprising . . . " does not preclude presence of additional elements in a process, method, article or device that includes the element.

In the related art, a control chip is usually arranged below a display region of a display panel, so a touch signal line connected to the control chip may also be arranged below a non-display region (i.e., a frame portion) aside of the display region of the display panel, which causes an excessively large frame width of the display panel, and affects the user experience.

In order to solve the above technical problems, embodiments of the present application provide a display panel. At least one of a first touch trace and a second touch trace may be located in a display region, so that space occupied by the first touch trace and/or the second touch trace in the non-display region may be reduced, which reduces the frame width of the display panel and improves the user experience.

For a better understanding of the present application, a detailed description of the display panel and the display device according to the embodiments of the present application will be given below with reference to FIG. 1 to FIG. 14.

Figure 1:
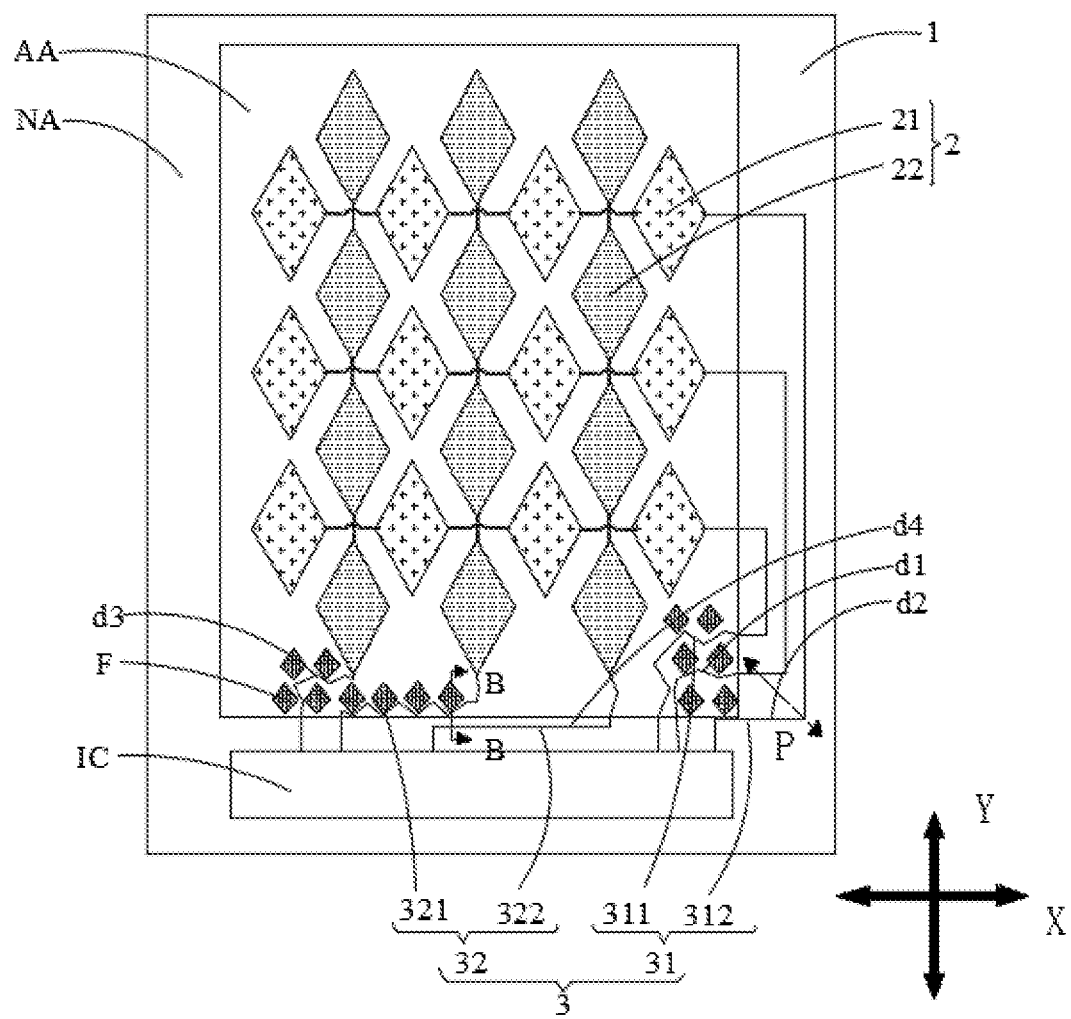
FIG. 1 is a schematic structural view of a display panel according to an embodiment of the present application.
Figure 2:
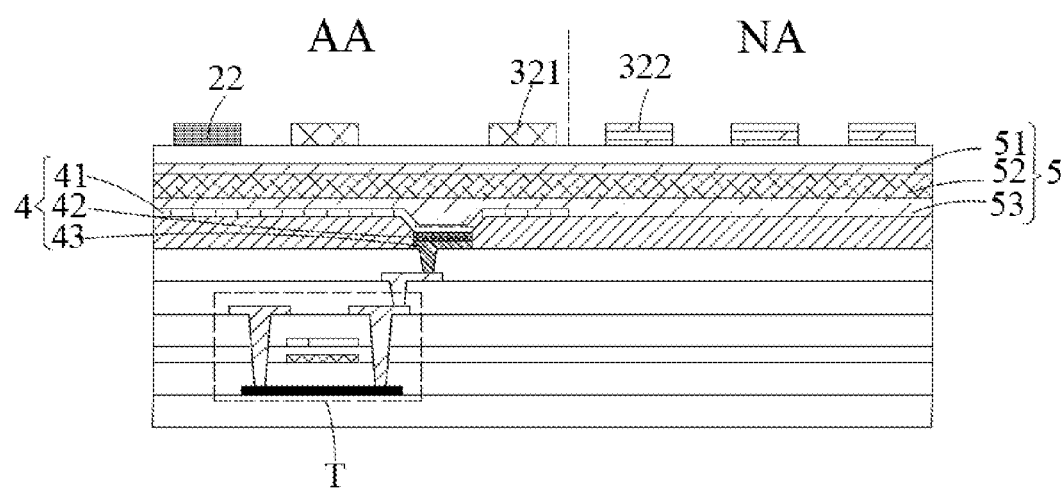
FIG. 2 is a structural view of a film layer of an embodiment at B-B in the FIG. 1.
Figure 3:
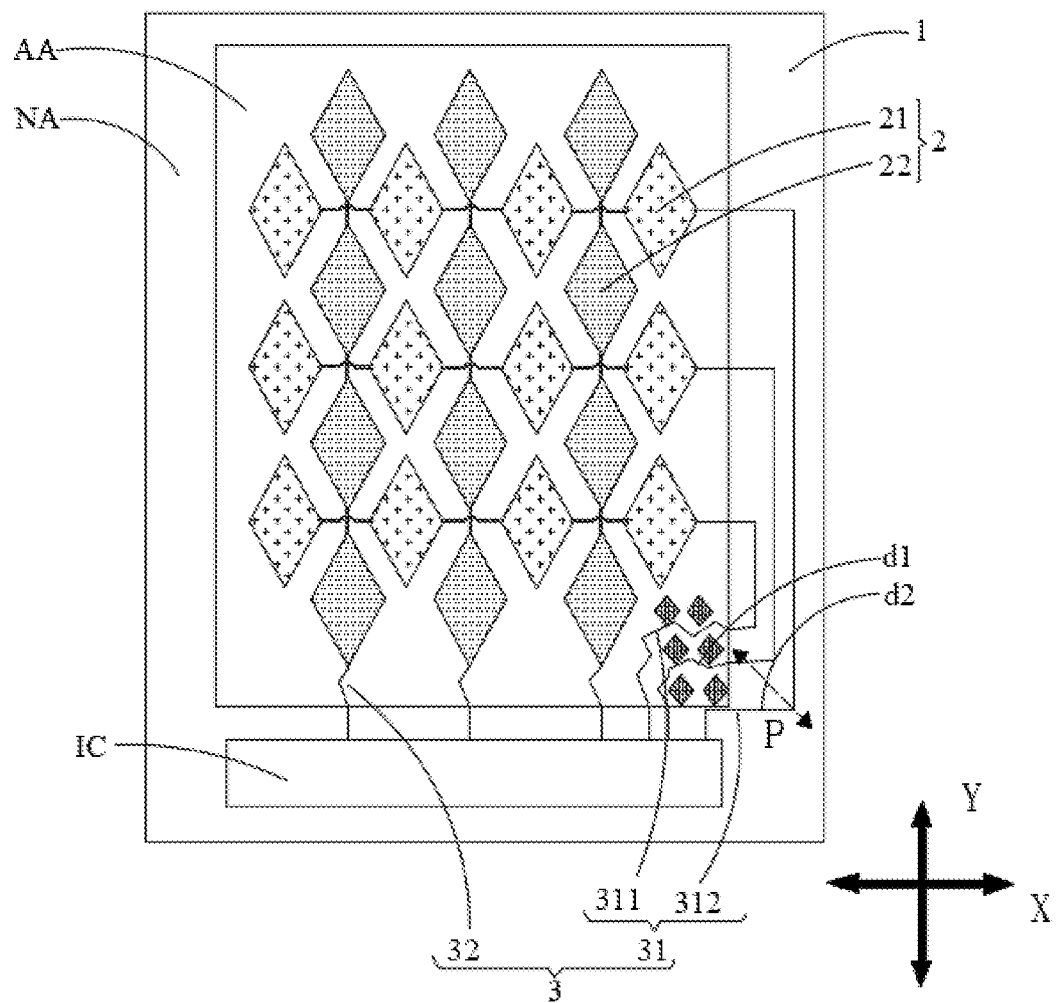
FIG. 3 is a schematic structural view of a display panel according to another embodiment of the present application.
Figure 4:
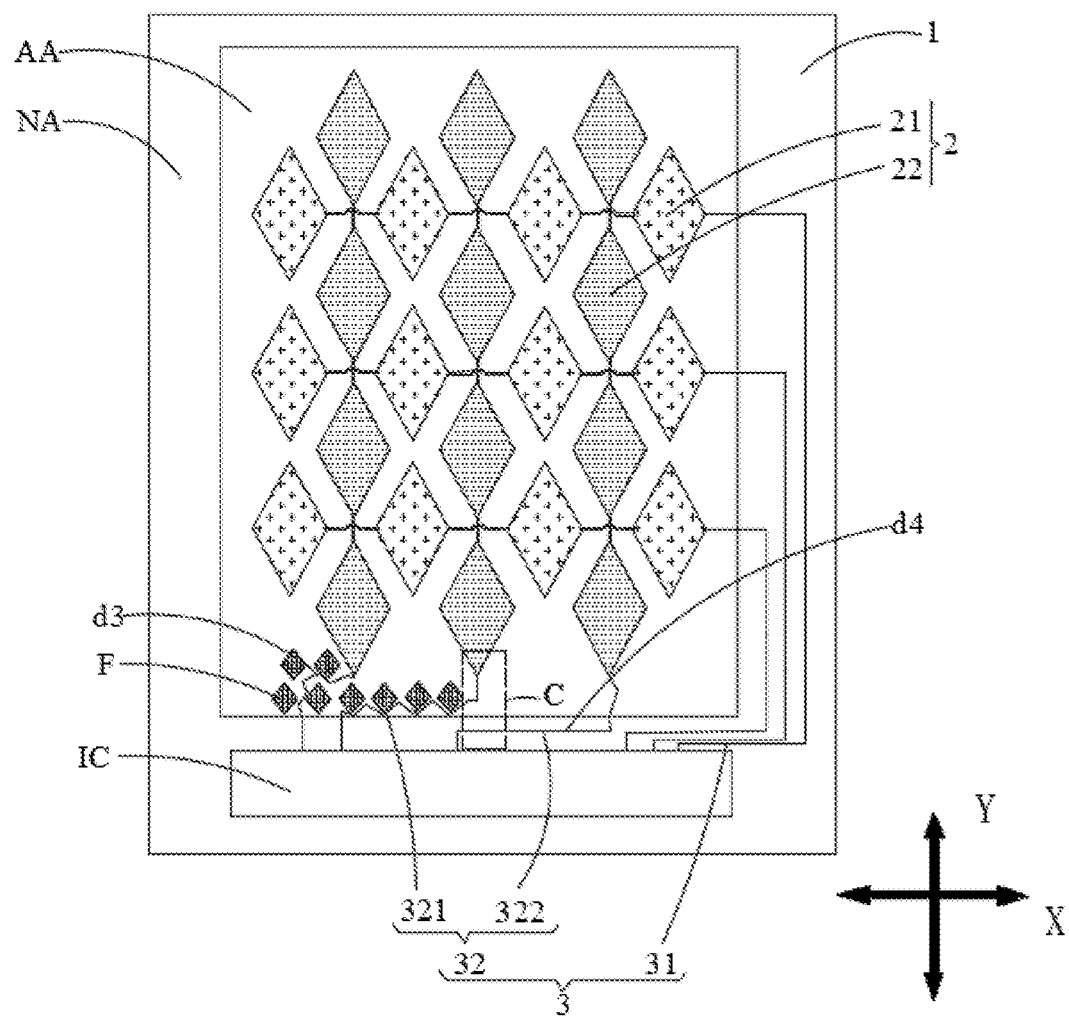
FIG. 4 is a schematic structural view of a display panel according to yet another embodiment of the present application.

Referring to FIG. 1 to FIG. 4, FIG. 1 is a schematic structural view of a display panel according to an embodiment of the present application; FIG. 2 is a structural view of a film layer of an embodiment at B-B in the FIG. 1; FIG. 3 is a schematic structural view of a display panel according to another embodiment of the present application; FIG. 4 is a schematic structural view of a display panel according to yet another embodiment of the present application.

Embodiments of the present application provide a display panel including a display region AA and a non-display region NA arranged adjacently. The display panel including: a substrate 1; a touch layer 2 located in the display region AA and being arranged on a side of the substrate 1, wherein the touch layer 2 includes one or more first touch electrodes 21 extending along a first direction X and arranged along a second direction Y and one or more second touch electrodes 22 extending along the second direction Y and arranged along the first direction X; a touch signal line 3 including a first touch trace 31 and a second touch trace 31, wherein the first touch trace 31 is electrically connected to the first touch electrodes 21, and the second touch trace 32 is electrically connected to the second touch electrodes 22; wherein at least one of the first touch trace 31 and the second touch trace 32 is located in the display region AA.

The display panel provided by the embodiments of the present application includes a substrate 1, a touch layer 2, and a touch signal line 3. The first touch trace 31 of the touch signal line 3 may be electrically connected to the first touch electrodes 21 and the second touch trace 32 of the touch signal line 3 may be electrically connected to the second touch electrodes 22, thereby transmitting a touch signal to the first touch electrodes 21 and the second touch electrodes 22, respectively. At least one of the first touch trace 31 and the second touch trace 32 may be located in the display region AA, that is, a part of the first touch trace 31 and/or the second touch trace 32 is moved from the non-display region NA to the display region AA, so that the space occupied by the first touch trace 31 and/or the second touch trace 32 in the non-display region NA is reduced. A part of the first touch electrodes 21 and/or the second touch electrodes 22 located at an edge of the display region AA may be eliminated, so as to use the provided space to arrange the first touch trace 31 and/or the second touch trace 32, which further reduces the frame width of the display panel and improves the user experience.

It should be noted that at least one of the first touch trace 31 and the second touch trace 32 being located in the display region AA means that a part of the first touch trace 31 may be located in the display region AA, and other part of the first touch trace 31 may be arranged in the non-display region NA, as shown in FIG. 3, or a part of the second touch trace 32 may be located in the display region AA, and other part of the second touch trace 32 may be arranged in the non-display region NA, as shown in FIG. 4, or at least a part of the first touch trace 31 and the second touch trace 32 may be located in the display region AA, as shown in FIG. 1, which is not particularly limited.

Because of limited space in the display region AA, optionally, when the first touch trace 31 and the second touch trace 32 further need to be electrically connected to a control chip IC located in the non-display region NA, not all of the first touch trace 31 and the second touch trace 32 are usually arranged in the display region AA.

The first touch trace 31 and the second touch trace 32 in the embodiments of the present application can also be understood as not including that part of traces connected to the control chip IC. Therefore, the first touch trace 31 and the second touch trace 32 may not pass through the non-display region NA, that is, at least one of the first touch trace 31 and the second touch trace 32 may be completely located in the display region AA.

Optionally, in order to allow space for arrangement of the first touch trace 31 and/or the second touch trace 32 in the display region AA, a part of the first touch electrodes 21 and a part of the second touch electrodes 22 may be replaced with the first touch trace 31 and/or the second touch trace 32.

A mutual capacitance structure is used by the touch layer 2 in the embodiments of the present application, and ones of the first touch electrodes 21 and the second touch electrodes 22 may be touch driving electrodes, and the others may be touch sensing electrodes. For example, the first touch electrodes 21 are the touch sensing electrodes, and the second touch electrodes 22 are the touch driving electrodes, and the first touch electrodes 21 and the second touch electrodes 22 may be electrically connected to the control chip IC through the first touch trace 31 and the second touch trace 32, respectively. The second touch trace 32 is configured to send a touch driving signal sent by the control chip IC to the second touch electrodes 22, and the first touch trace 31 is configured to transmit a touch sensing signal generated by the first touch electrodes 21 back to the control chip IC.

The touch signal line 3 may be specifically made of a single-layer metal such as molybdenum or a titanium-aluminum-titanium composite metal layer. Specifically, the molybdenum has good electrical conductivity and does not deflect light. The touch signal line 3 may specifically use the molybdenum-aluminum-molybdenum composite metal layer with lower resistance, less signal attenuation and better signal transmitting effect.

The substrate 1 may be a rigid substrate, such as a glass substrate. The substrate 1 may also be a flexible substrate made of materials such as polyimide, polystyrene, polyethylene terephthalate, parylene, polyethersulfone or polyethylene naphthalate. The substrate 1 may be mainly configured to support devices arranged thereon.

The display panel provided by the embodiments of the present application includes a display region AA and a non-display region NA arranged adjacently. The display region AA is a region capable of emitting light and displaying, and light-emitting elements are arranged therein. The display panel provided by the embodiments of the present application may be an organic light-emitting diode (OLED) display panel, a quantum dot light emitting diodes (QLED) or micro flat display panel (Micro-OLED or Micro-LED), etc. In the following description, an OLED display panel will be given as an example.

Referring to FIG. 3, in some optional embodiments, at least a part of the first touch trace 31 may be located in the display region AA.

In this embodiment, a part of the first touch trace 31 may be arranged in the display region AA, so that the space occupied by the first touch trace 31 in the non-display region may be reduced. In order to enable the display region AA to have enough space to accommodate a part of the first touch trace 31, at least a part of the first electrodes 21 adjacent to the first touch trace 31 may be replaced with the first touch trace 31.

Specifically, a part of the first touch trace 31 and a part of the first touch electrodes 21 in the display region AA may be formed by a same process, and a part of the first touch trace 31 and a part of the first touch electrodes 21 in the display region AA may have a same structural shape. however, the first touch trace 31 is only used for transmitting the touch signal and does not have a function of forming an electric field between the first touch electrode 21 and the second touch electrode 22, which may also be understood as a part of the first touch electrodes 21 are replaced with the first touch trace 31, and in the display region AA, the first touch trace 31 may occupy a part of space where the first touch electrode 21 is originally arranged.

As shown in FIG. 1 and FIG. 3, when a plurality of first touch traces 31 are arranged in the display region AA, trace length of the first touch trace 31 located on an outer side is greater than trace length of the first touch trace 31 located on an inner side, which is convenient for the first touch electrodes 21 arranged along the second direction Y and located in different columns and for the first touch trace 31. The inner side and the outer side can be understood as a distance relative to the non-display region NA, that is, the first touch trace 31 on the outer side is closer to the non-display region NA.

As shown in FIG. 1 and FIG. 3, in some optional embodiments, the first touch trace 31 includes a first sub-touch trace 311 and a second sub-touch trace 312. The first sub-touch trace 311 is located in the display region AA, and the second sub-touch trace 312 is located in the non-display region NA.

It can be understood that because of the limited space in the display region AA, a part of the first touch trace 31 is located in the display region AA (i.e., the above first sub-touch trace 311) and other part of the first touch trace 31 is located in the non-display region NA (i.e., the above second sub-touch trace 312). For example, as shown in FIG. 1 and FIG. 3, the first touch trace 31 on a side away from the control chip IC is traced through the non-display region NA, i.e., the second sub-touch trace 312; the first touch trace 31 on a side close to the control chip IC is traced through the display region AA, i.e., the first sub-touch trace 311. Therefore, tracing around is avoided, which reduces trace length and impedance.

The first sub-touch trace 311 and the second sub-touch trace 312 may be connected to the first touch electrodes 21 arranged along the second direction Y and located in the different columns, that is, no substantial difference exists between signals transmitted by the first sub-touch trace 311 and the second sub-touch trace 312, only trace positions of the first sub-touch trace 311 and the second sub-touch trace 312 are different.

As shown in FIG. 1, when the first sub-touch trace 311 traces through the display region AA and is connected to the first touch electrode 21, the frame width of the display panel along the direction P can be reduced.

As shown in FIG. 1 and FIG. 3, in some optional embodiments, the first sub-touch trace 311 includes one or more first trace segments d1 located in the display region AA and extending along the first direction X, and the second sub-touch trace 312 includes one or more second trace segments d2 located in the non-display region NA and extending along the first direction X.

It should be noted that the first sub-touch trace 311 and the second sub-touch trace 312 need to be connected to the first touch electrodes 21 extending along the first direction X and arranged in the second direction Y, so in this embodiment, the first trace segments d1 in the display region AA and the second trace segments d2 in the non-display region NA extend along the first direction X. In one aspect, regularity of the wiring may be improved, in another aspect, connecting the first sub-touch trace 311 and the second sub-touch trace 312 to the first touch electrodes 21 extending along the second direction Y and located in different rows may be convenient.

Optionally, a length of the first trace segment d1 extending along the first direction X is equal to a length of the second trace segment d2 extending along the first direction X, and the first trace segment d1 and the second trace segment d2 are arranged in sequence along the second direction Y to avoid mutual interference and improve uniformity of the impedances of the first trace segment d1, the second trace segment d2 and the regularity of the wiring.

Optionally, the first sub-touch trace 311 and the second sub-touch trace 312 further include connecting segments (not shown in the figure) located in the non-display region NA. The first trace segment d1 and the second trace segment d2 are connected to the connecting segments, respectively. At least a part of the connecting segments extend along the second direction Y, and the connecting segments are connected to the first touch electrodes 21 located in the different rows extending along the second direction Y, respectively.

In this embodiment, compared to the related art, the first trace segment d1 can be understood as: a trace originally located in the non-display region NA is moved to in the display region AA. Optionally, according to space size of the display region AA, a plurality of first trace segments d1 arranged along the second direction Y may be arranged in the display region AA. The maximum width of an arrangement structure along the second direction Y formed by the first trace segments d1 may be the reduced with of the frame width of the display panel along the second direction Y.

In this embodiment, the first trace segment d1 and an adjacent second trace segment d2 may be arranged side by side along the second direction Y, but one of the first trace segment d1 and the adjacent second trace segment d2 is located in the display region AA and the other is located in the non-display region NA, so that the regularity of arrangement of the traces may be improved, which eases the arrangement.

As shown in FIG. 1 and FIG. 3, in some optional embodiments, the display panel further includes a light-emitting device layer 4 including a plurality of light-emitting units F. The first trace segment d1 is located between two light-emitting units F and is of a zigzag shape or of a wave shape.

In this embodiment, the first trace segment d1 is located between the two light-emitting units F, so that the first trace segment d1 may avoid the light-emitting units F, so as to prevent the first trace segment d1 from blocking the light-emitting unit F, thereby not affecting normal light emission of the light-emitting unit F. Specifically, an orthographic projection of the first trace segment d1 on the substrate 1 does not overlap an orthographic projection of the light-emitting unit F on the substrate, so as to prevent the first trace segment d1 from blocking the light-emitting unit F, which is specifically achieved by adjusting a trace path of the first trace segment d1, that is, the first trace segments d1 in this embodiment may be of the zigzag shape or of the wave shape.

In order to clearly show a relative position and a connection relationship between the touch layer 2 and the touch signal line 3, and to avoid an interference of the light-emitting unit F to the showing of the touch layer 2 or the touch signal line 3, only some of the light-emitting units F (but not all of the light-emitting units F) are shown in FIG. 1 and FIG. 3.

Optionally, at least one light-emitting unit F is included between adjacent first trace segments d1, that is, the adjacent first trace segments d1 may be traced through different positions. For example, adjacent first trace segments d1 are separated by one or more light-emitting units F to avoid mutual interference between the adjacent first tracing segments d1.

As shown in FIG. 1 and FIG. 4, in some optional embodiments, at least a part of the second touch trace 32 is located in the display region AA.

It can be understood that, similar to the first touch trace 31, at least a part of the second touch trace 32 may be moved from the non-display region NA to the display region AA, so that the space occupied by the first touch trace 31 in the non-display region may be reduced. In order to enable the display region AA to have enough space to accommodate a part of the first touch trace 31, a part of the second electrodes 22 adjacent to a part of the second touch trace 32 may be replaced with the first touch trace 31.

It should be noted that the first touch trace 31 and the second touch trace 32 may be at least partially located in the display region AA at a same time. That is, the first touch trace 31 and the second touch trace 32 may completely be located in the display region AA, or, a part of the first touch trace 31 and a part of the second touch trace 32 may be located in the display region AA.

Alternatively, considering that wiring space of the display region AA is limited, so one of the first touch trace 31 and the second touch trace 32 may be at least partially located in the display region AA. Specifically, the first touch trace 31 is completely or partly located in the display region AA, and the second touch trace 32 is located in the non-display region NA; or, the second touch trace 32 is completely or partially is located in the display region AA, and the first touch trace 31 is located in the non-display region NA, which is not particularly limited.

As shown in FIG. 1 and FIG. 3, in some optional embodiments, the second touch trace 32 includes a third sub-touch trace 321 and a fourth sub-touch trace 322. The third sub-touch trace 321 is located in the display region AA, and the fourth sub-touch trace 322 is located in the non-display region NA.

In this embodiment, the second touch trace 32 is partially located in the display region AA and the second touch trace 32 is partially located in the non-display region NA, so as to ensure that the display region AA accommodates all of the second touch trace 32, that is, the third sub-touch trace 321 of the second trace 32 is located in the display region AA. On the premise that the display is not affected, the number of wirings of the second touch trace 32 in the non-display region NA may be reduced, which reduces frame width of the non-display region in which a part of the second touch trace 32 is correspondingly arranged.

As shown in FIG. 1 and FIG. 3, in some optional embodiments, the third sub-touch trace 321 includes a third trace segment d3 located in the display region AA and extending along the first direction X, and the fourth sub-touch trace 322 includes a fourth trace segment d4 located in the non-display region NA and extending along the first direction X.

It should be noted that the second touch trace 32 needs to be connected to the second touch electrodes 22 arranged along the second direction Y and the first direction X, so with the adjustment of trace length (along the first direction X) of each third trace segment d3 and trace length (along the first direction X) of each fourth segment d4, the second touch trace 32 is connected to the second touch electrodes 22 located in different columns along the first direction X.

Optionally, a plurality of third sub-touch traces 321 are arranged in the display region AA and third sub-touch trace 321 are arranged along the second direction Y It can be understood that because the number of the second touch electrodes 22 is fixed, the number of required second touch traces 32 is also fixed. When the number of the third sub-touch traces in the display region AA is greater, the number of the fourth sub-touch traces in the non-display region NA is correspondingly less, which reduces frame width of the non-display region in which the fourth sub-touch traces are correspondingly arranged.

As shown in FIG. 1 or FIG. 4, a part of the third trace segments d3 are arranged in the display region AA and extend along the first direction X, which may reduce frame width of the display panel along the second direction Y.

Optionally, the third trace segment d3 is located between the two light-emitting units F, and the third trace segment d3 may be of the zigzag shape or of the wave shape. Similar to the first trace segment d1, the third trace segment d3 may be of the zigzag shape or of the wave shape, so that the third trace segment d3 may avoid the light-emitting units F, so as to prevent the third trace segment d3 from blocking the light-emitting unit F, thereby not affecting light emission.

Optionally, at least one light-emitting unit F is included between adjacent third trace segments d3 to avoid mutual interference between the adjacent third trace segments d3.

Optionally, in addition to the first trace segment d1 and the third trace segment d3, other part of traces in the first touch trace 31 and the second touch trace 32 located in display region AA may also be of the zigzag shape or of the wave shape, so that the blocking of the light-emitting units F may be prevented.

Figure 5:
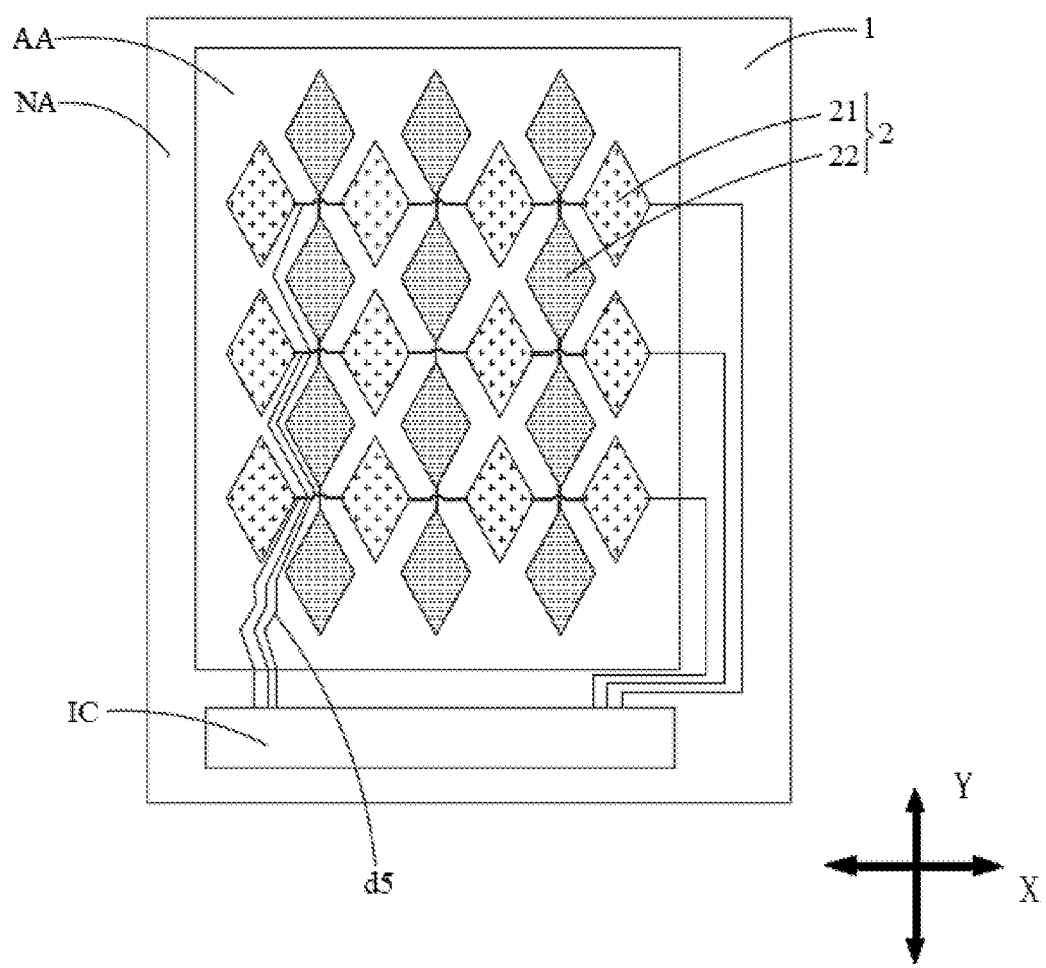
FIG. 5 is a schematic structural view of a display panel according to yet another embodiment of the present application.

Referring to FIG. 5, which is a schematic structural view of a display panel according to yet another embodiment of the present application. In some optional embodiments, the first touch trace 31 includes fifth trace segments d5 located in the display region AA. Each fifth trace segment d5 is arranged in a gap between the first touch electrode 21 and the second touch electrode 22 to connect the first touch electrodes 21 located in the different rows along the second direction Y.

The fifth trace segment d5 in this embodiment may be traced through the gap between the first touch electrode 21 and the second touch electrode 22 and does not need to trace around the non-display region NA, which effectively reduces the trace length of the first touch trace 31, thereby reducing impedance of the first touch trace 31 and improving touch signal transmitting efficiency of the first touch trace 31. At the same time, since the fifth trace segment d5 is traced directly through the gap between the first touch electrode 21 and the second touch electrode 22, the space occupied by the first touch trace 31 in the non-display region NA may be reduced, which plays a role of reducing the frame width of the display panel.

Optionally, as shown in FIG. 5, at least two fifth trace segments d5 may be traced through the gap between the first touch electrode 21 and the second touch electrode 22 at a same position, which eases the forming.

Optionally, a total of N columns of the fifth trace segments d5 are arranged. The fifth trace segment d5 of an $m^{th}$ column and the fifth trace segment d5 of an $(m+1)^{th}$ column are located in the gap between the first touch electrode 21 and the second touch electrode 22 at a same position, which eases the wiring. Wherein N is a positive integer and N≥2, m is a positive integer and m≥1, and m<N.

In order to prevent overly large number of fifth trace segments d5 from passing through the gap between the first touch electrode 21 and the second touch electrode 22 at the same position and affecting touch effects of the first touch electrode 21 and the second touch electrode 22, optionally, the fifth trace segment d5 of the $m^{th}$ column and a (m+6)th column is traced through different gaps between the first touch electrodes 21 and the second touch electrodes 22. That is, no more than five fifth trace segments d5 are arranged in a same gap to avoid mutual interference among the fifth trace segments d5 or affecting the touch effects of the first touch electrode 21 and the second touch electrode 22.

Figure 6:
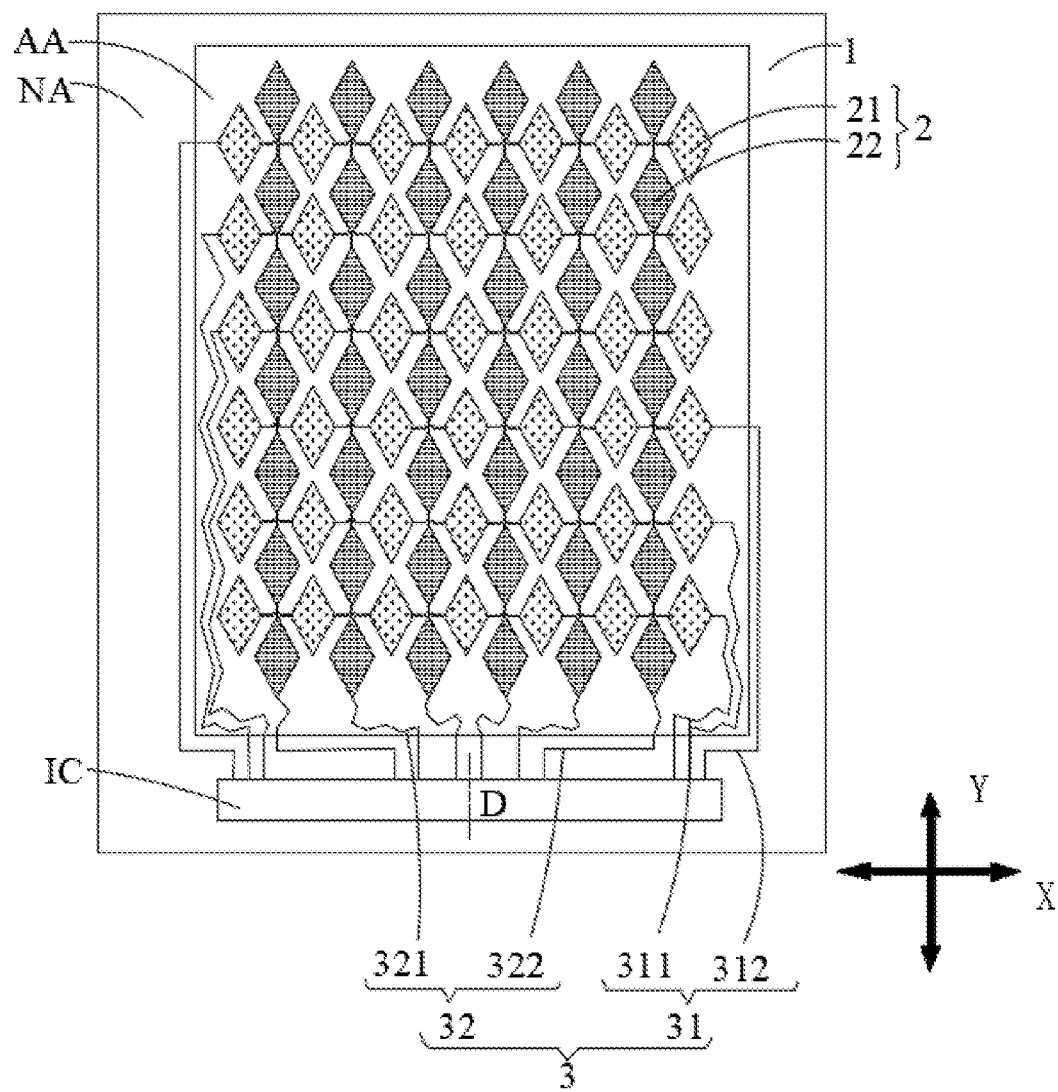
FIG. 6 is a schematic structural view of a display panel according to yet another embodiment of the present application.

Optionally, as shown in FIG. 6, a total of 6 rows of first touch electrodes 21 and 6 columns of second touch electrodes 22 are arranged. The control chip IC is divided into a left end and a right end with a center line D as a boundary. Three first touch traces 31 connected to the left end of the control chip IC are connected to three rows of first touch electrodes 21 away from the control chip IC, respectively; and three second touch traces 32 connected to the left end of the control chip IC are connected to three columns of second touch electrodes 22 close to the left end of the control chip IC, respectively; three first touch traces 31 connected to the right end of the control chip IC are connected to three rows of first touch electrodes 21 close to the control chip IC, respectively; and three second touch traces 32 connected to the left end of the control chip IC are connected to three columns of second touch electrodes 22 close to the right end of the control chip IC, respectively; so that impedance of the first touch trace 31 and impedance of the second touch trace 32 are balanced.

Figure 7:
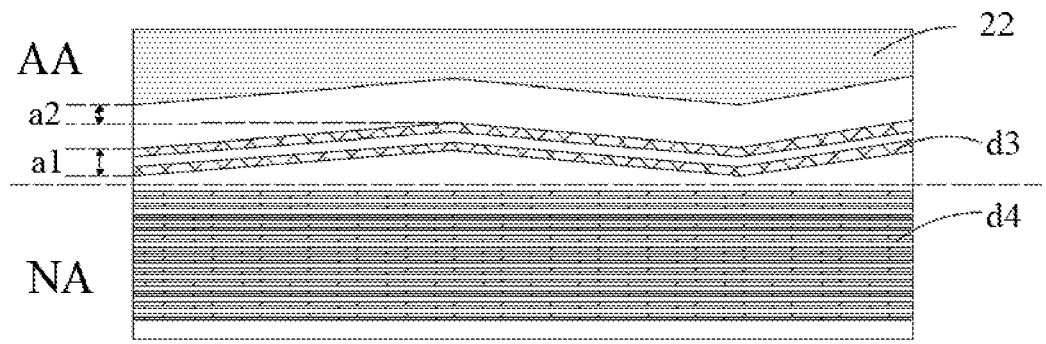
FIG. 7 is a partial magnified view of an embodiment at C in the FIG. 4.

In order to ensure the touch effects of the display panel and to prevent the third trace segment d3 from being arranged in the display region AA and affecting touch greatly, referring to FIG. 7. FIG. 7 is a partial magnified view of an embodiment at C in the FIG. 4. In some optional embodiments, along the second direction Y, a minimum distance a1 from a third trace segment d3 close to the non-display region NA to a third trace segment d3 away from the non-display region NA is less than or equal to width of the second touch electrode 22 along the second direction Y.

It should be noted that the third trace segments d3 (at least two) are arranged in the display region AA and a certain gap exists between two adjacent third trace segments d3. Along the second direction Y, a minimum distance a1 from a third trace segment d3 close to the non-display region NA to a third trace segment d3 away from the non-display region NA is width (along the second direction Y) of the arrangement structure formed by the third trace segments d3. Space occupied by this part of the third trace segments d3 may be space where the second touch electrodes 22 are originally arranged, that is, the greater the minimal distance from the third trace segment d3 close to the non-display region NA to the third trace segment d3 away from a side of the non-display region NA is, the greater a size of the second touch electrode 22 that needs to be reduced is. When the minimal distance from the third trace segment d3 close to the non-display region NA to the third trace segment d3 away from a side of the non-display region NA is overly great, a touchable region of the display panel will be affected, thereby affecting the user experience. Therefore, in this embodiment, the minimum distance a1 from the third trace segment d3 close to the non-display region NA to the third trace segment d3 away from the non-display region NA may be limited as being less than or equal to width of one second touch electrode 22 along the second direction Y, to ensure the display panel has sufficient touch region.

Considering a size of space where the display region AA is arranged and frame width of the display panel that needs be reduced, optionally, along the second direction Y, the minimum distance a1 from the third trace segment d3 close to the non-display region NA to the third trace segment d3 away from the non-display region NA may be less than or equal to 4 mm. For example, the minimum distance a1 from the third trace segment d3 close to the non-display region NA to the third trace segment d3 away from the non-display region NA may be equal to 4 mm.

Considering process accuracy during formation of the third trace segment d3 and the second touch electrode 22, a minimum distance between the third trace segment d3 and the second touch electrode 22 should not be overly less. Interference occurs between the third trace segment d3 and the second touch electrode 22 when the minimum distance between the third trace segment d3 and the second touch electrode 22 is overly less. In order to avoid the above problem, as shown in FIG. 6, in some optional embodiments, along the second direction Y, a minimum distance a2 between the third trace segment d3 and the second touch electrode 22 may be greater than or equal to 30 m.

It should be noted that, the minimum distance a2 between the third trace segment d3 and the second touch electrode 22 may be specifically selected according to the process accuracy during the formation of the third trace segment d3 and the second touch electrode 22. For example, when the third trace segment d3 and the second touch electrode 22 are formed by evaporation plating process, the minimum distance a2 between the third trace segment d3 and the second touch electrode 22 along the second direction Y may be greater than or equal to 30 m.

Optionally, each of the first touch trace 31 and the second touch trace 32 may use a single-layer trace for a trace close to a control chip IC end; each of the first touch trace 31 and the second touch trace 32 may use a double-layer trace for a trace away from the control chip IC end, that is, a trace with an upper layer and a lower layer connected in parallel is configured to reduce the impedance. It can be understood that trace length of the trace away from the control chip IC end is greater, impedance of the trace away from the control chip IC end is greater than impedances of the trace of the first touch trace 31 and the trace of the second touch trace 32 close to the control chip IC end, so the impedance of the trace away from the control chip IC end may be reduced by using of double-layer trace, so as to balance a difference between the impedances of the trace of the first touch trace 31 and the second touch trace 32 close to the control chip IC end and the impedance of the trace away from the control chip IC end.

Figure 8:
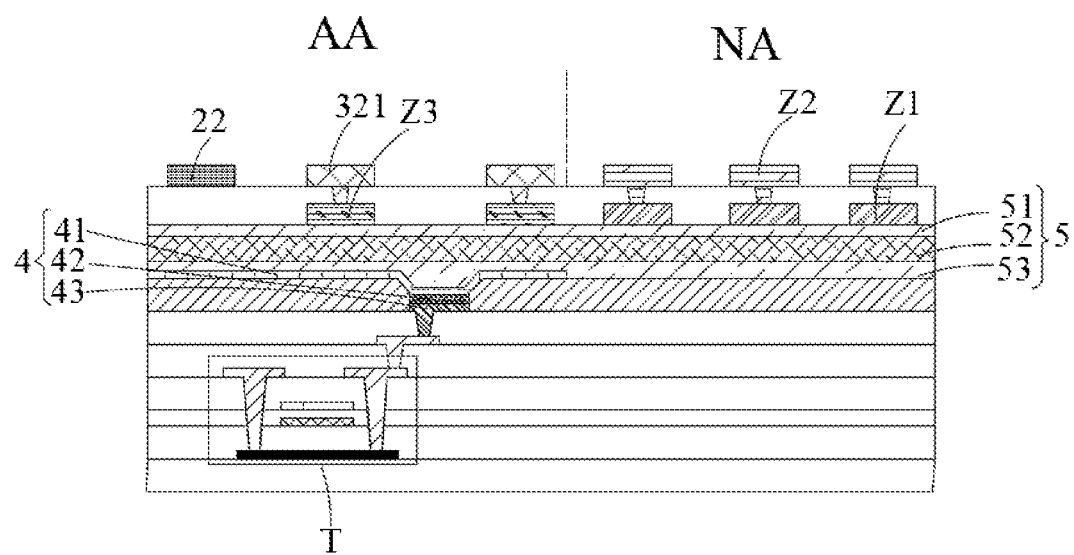
FIG. 8 is a structural view of a film layer of another embodiment at B-B in the FIG. 1.

Referring to FIG. 8, which is a structural view of a film layer of another embodiment at B-B in the FIG. 1. In some optional embodiments, along a direction perpendicular to a plane where the substrate 1 is located, a part of the first touch trace 31 located in the non-display region NA and a part of the second touch trace 32 located in the non-display region NA both include a first sub-touch portion Z1 and a second sub-touch portion Z2 arranged in different layers and connected through a via.

In this embodiment, the first sub-touch portion Z1 and the second sub-touch portion Z2 are arranged in the different layers and connected by the via, that is, the first sub-touch portion Z1 and the second sub-touch portion Z2 can be understood as a touch trace with two parts connected in parallel. According to a principle of parallel resistance, the first sub-touch portion Z1 and the second sub-touch portion Z2 arranged in parallel can effectively reduce total impedance, which improves accuracy of touch signal transmission. The part of the first touch trace 31 located in the non-display region NA and the part of the second touch trace 32 located in the non-display region NA both include the first sub-touch portion Z1 and the second sub-touch portion Z2, so as to reduce total impedance of the first touch trace 31 and total impedance of the second touch trace 32, respectively.

Figure 9:
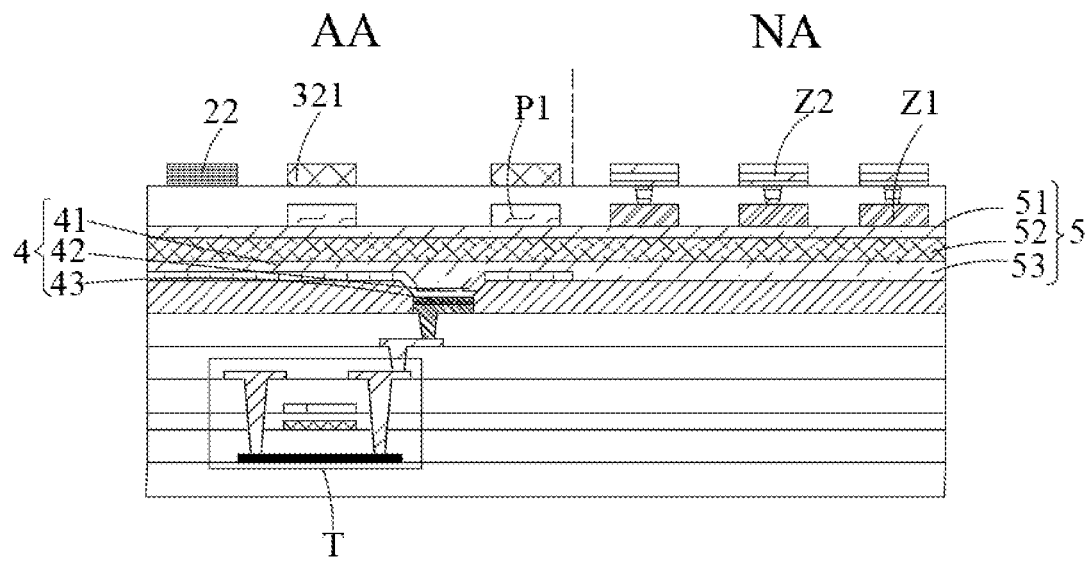
FIG. 9 is a structural view of a film layer of yet another embodiment at B-B in the FIG. 1.

In order to avoid signal interference between a part of the first touch trace 31 and the second touch trace 32 located in the display region AA and a component or the signal trace in the display region AA, such as a thin film transistor T, please refer to FIG. 9. FIG. 9 is a structural view of a film layer of another embodiment at B-B in the FIG. 1. In some optional embodiments, the display panel further includes a first shielding block P1, and the first shielding block P1 is arranged between the part of the first touch trace 31 and the second touch trace 32 located in the display region AA and the substrate 1. An orthographic projection of the first shielding block P1 on the substrate 1 covers an orthographic projection of the part of the first touch trace 31 and the second touch trace 32 located in the display region AA on the substrate 1.

It should be noted that the first shielding block P1 may be specifically made of a material such as a metal. A signal generated by the first touch trace 31 and/or the second touch trace 32 can be blocked to avoid the signal interference between the first touch trace 31 and/or the second touch trace 32 and other trace or the component in the display panel. The orthographic projection of the first shielding block P1 on the substrate 1 covers the orthographic projection of the part of the first touch trace 31 and the second touch trace 32 located in the display region AA on the substrate 1, that is, the first shielding block P1 can block the part of the first touch trace 31 and the second touch trace 32 located in the display region AA.

As shown in FIG. 9, in order to prevent film thickness of the display panel from being overly thick, optionally, the first shielding block P1 and the first sub-touch portion Z1 may be arranged in a same layer. In order to arrange the first shielding block P1 and the first sub-touch portion Z1 on the same layer, the first shielding block P1 and the first sub-touch portion Z1 may be formed together by a same process, which can improve forming efficiency and reduce manufacturing costs at the same time. Specifically, the first shielding block P1 and the first sub-touch portion Z1 may be made of a same material.

In addition to reducing the signal interference by using the first shielding block P1, an existing film layer of the display panel may also be configured to block the part of the first touch trace 31 and the second touch trace 32 located in the display region AA. Optionally, the display panel further includes a light-emitting device layer and an encapsulation layer both of which are at least arranged in the display region AA. Along the direction perpendicular to the plane where the substrate 1 is located, the light-emitting device layer 4 and the encapsulation layer 5 are stacked between the substrate 1 and the touch layer 2. The light-emitting device layer 4 includes a cathode layer 41. An orthographic projection of the cathode layer on the substrate 1 at least partially overlaps an orthographic projection of the second touch trace 32 on the substrate 1.

It should be noted that the cathode layer 41 may be any metal material such as silver (Ag), aluminum (Al), lithium (Li), magnesium (Mg), ytterbium (Yb), calcium (Ca), or indium (In), and may also be an alloy of the aforementioned metal materials, such as magnesium-silver alloy (Mg/Ag), lithium-aluminum alloy (Li/Al), which is not limited in this embodiment. The cathode layer 41 may also block the first touch trace 31 and the second touch trace 32 to a certain extent. Optionally, the light-emitting device layer 4 further includes an anode layer 43 and a light-emitting layer 42 which are stacked. The cathode layer 41 covers the light-emitting layer 42.

In addition, the encapsulation layer 5 is also arranged between the substrate 1 and the light-emitting device layer 4, and the encapsulation layer 5 may include a first inorganic layer 51, an organic layer 52 and a second inorganic layer 53 that are stacked, that is, the encapsulation layer 5 adopts a thin film encapsulation structure. Therefore, thickness of the encapsulation layer 5 is greater, which may also block the first touch trace 31 and the second touch trace 32 to a certain extent.

Optionally, the display panel further includes a pixel circuit electrically connected to the light-emitting device layer 4, and the pixel circuit includes a plurality of thin film transistors T.

In order to reduce impedance of the part of the first touch trace 31 and the second touch trace 32 located in the display region AA, as shown in FIG. 7, in some optional embodiments, the display panel further includes a third sub-touch portion Z3. The third sub-touch portion Z3 and the first sub-touch portion Z1 are arranged in a same layer, and the third sub-touch portion Z3 is electrically connected to the part of the first touch trace 31 and the second touch trace 32 located in the display region AA through the via.

It can be understood that, an additional resistor may be connected in parallel to the part of the first touch trace 31 and the second touch trace 32 located in the display region AA by the third sub-touch portion Z, that is, the third sub-touch portion. Z3 is connected in parallel to the part of the first touch trace 31 and the second touch trace 32 located in the display region AA. At least one of the first touch trace 31 and the second touch trace 32 is arranged in the display region AA, so the part of the first touch trace 31 and the second touch trace 32 located in the display region AA specifically may be the part of the first touch trace 31 located in the display region AA and/or the part of the second touch trace 32 located in the display region AA.

The third sub-touch portion Z3 and the first sub-touch portion Z1 are arranged in the same layer, which specifically can be understood as: the third sub-touch portion Z3 and the first sub-touch portion Z1 are made of a same material, or the third sub-touch portion Z3 and the first sub-touch portion Z1 may be formed by a same process and the third sub-touch portion Z3 and the first sub-touch portion Z1 are made of the same material, which improves manufacturing efficiency and reduce the manufacturing costs.

Figure 10:
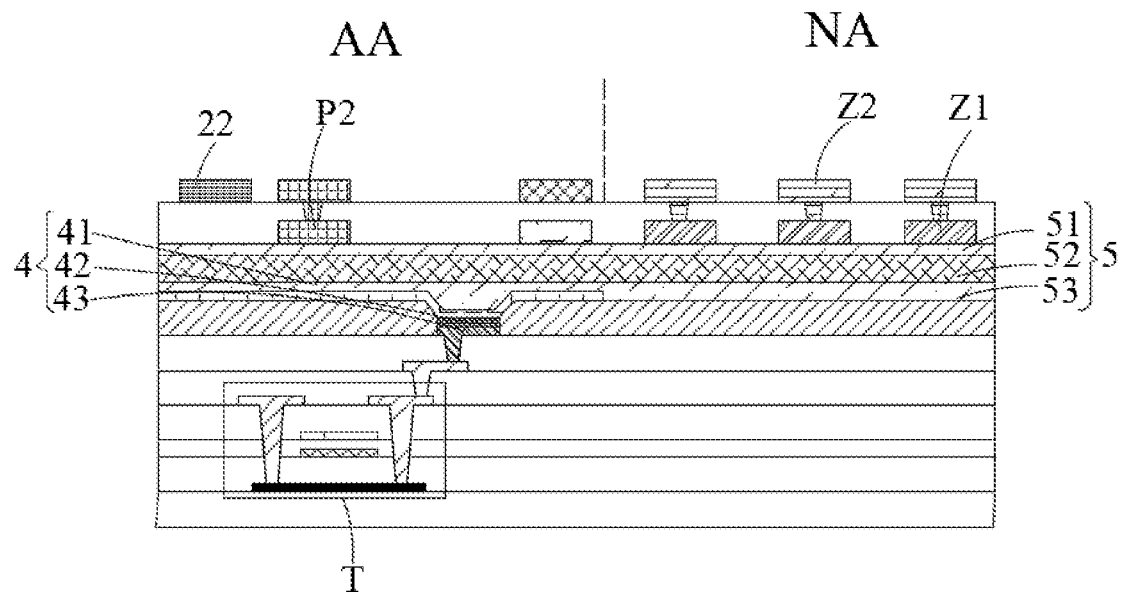
FIG. 10 is a structural view of a film layer of yet another embodiment at B-B in the FIG. 1.
Figure 11:
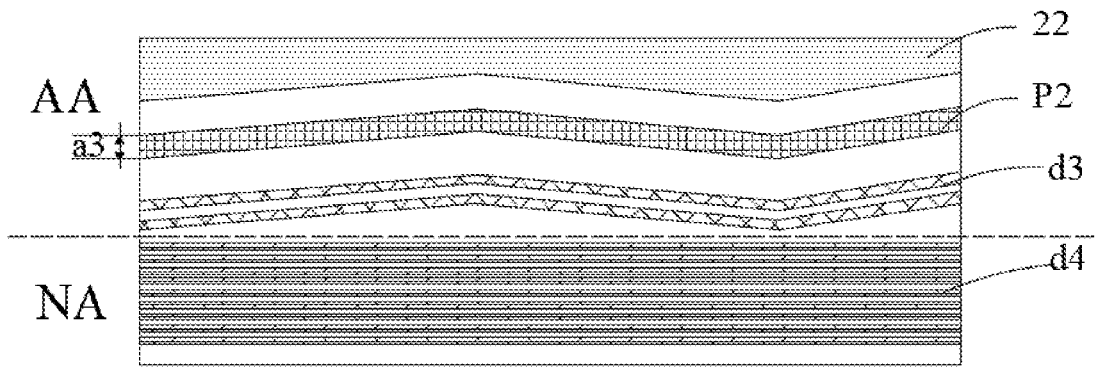
FIG. 11 is a partial magnified view of another embodiment at C in the FIG. 4.

The first touch trace 31 needs to be connected to the first touch electrodes 21 located in different rows along the second direction Y, so time sequences of signals transmitted by the first touch trace 31 are different to a certain extent. For the same reason, the second touch trace 32 needs to be connected to the second touch electrodes 22 located in different columns along the first direction X, so time sequences of signals transmitted by the second touch trace 32 are different to certain extent. In order to avoid signal interference between the part of the first touch trace 31 and the second touch trace 32 located in the display region AA and the first touch electrodes 21 and the second touch electrodes 22, referring to FIG. 10 and FIG. 11. FIG. 10 is a structural view of a film layer of another embodiment at B-B in the FIG. 1, and FIG. 11 is a partial magnified view of another embodiment at C in the FIG. 4. In some optional embodiments, along a direction parallel to the plane where the substrate 1 is located, a second shielding block P2 is arranged between the part of the first touch trace 31 and the second touch trace 32 located in the display region AA and an adjacent first touch electrode 21 or an adjacent second touch electrode 22.

It can be understood that, a distance between the part of the first touch trace 31 and the second touch trace 32 located in the display region AA and the first touch electrode 21 or the second touch electrode 22 is relatively close, that is, along the direction parallel to the plane where the substrate 1 is located, signal interference exists between the part of the first touch trace 31 and the second touch trace 32 located in the display region AA and the first touch electrode 21 or the second touch electrode 22, such as capacitive coupling. With an arrangement of the second shielding block P2, a signal generated by the part of the first touch trace 31 and the second touch trace 32 located in the display region AA or a signal generated by the first touch electrode 21 and the second touch electrode 22 may be blocked. The second shielding block P2 may specifically be made of a metal or other conductive materials.

When only at least a part of the first touch trace 31 is arranged in the display region AA, the second shielding block P2 may be arranged between the first touch trace 31 only located in the display region AA and an adjacent first touch electrode 21, and/or when only at least a part of the second touch trace 32 is arranged in the display region AA, the second shielding block P2 may be arranged between the second touch trace 32 only located in the display region AA and an adjacent second touch electrode 22.

In some optional embodiments, as shown in FIG. 11, in order to ensure a shielding effect of the second shielding block P2, in a direction parallel to a plane where the substrate 1 is located, width a3 of the second shielding block P2 is greater than or equal to width of a single trace of the first touch trace 31 and the second touch trace 32 located in the display region AA.

It can be understood that, the greater the width a3 of the second shielding block P2 is, the better the shielding effect of the second shielding block is. But a second shielding block P2 with an overly wide width a3 will occupy more space and affect a layout of the display panel. Optionally, the width a3 of the second shielding block P2 may be equal to the width of the single trace of the first touch trace 31 and the second touch trace 32 located in the display region AA. That is, the width a3 of the second shielding block P2 may be equal to the width of the trace of the first touch trace 31 or the width of the trace of the second touch trace 32, which ensures the shielding effect of the second shielding block p2 and avoid affecting the layout of the display panel because of the second shielding block P2 with a greater width a3.

Figure 12:
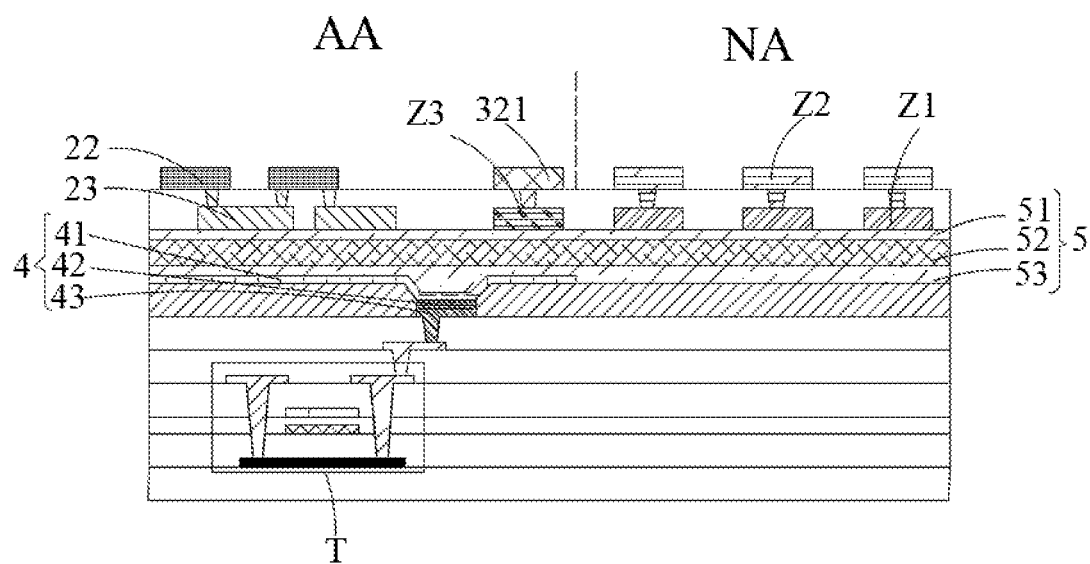
FIG. 12 is a structural view of a film layer of yet another embodiment at B-B in the FIG. 1.

Referring to FIG. 12, which is a structural view of a film layer of yet another embodiment at B-B in the FIG. 1. In some optional embodiments, the touch layer 2 includes a bridge layer 23 and a touch electrode layer stacked along the direction perpendicular to the plane where the substrate 1 is located. The first touch electrode 21 and the second touch electrode 22 are arranged in the touch electrode layer, and adjacent first touch electrodes 21 along the first direction X are electrically connected to each other through a bridge portion of the bridge layer 23. The first sub-touch portion Z1 and the bridge portion are arranged in a same layer, and the second sub-touch portion Z2 and the touch electrode layer are arranged in a same layer.

It should be noted that since the first touch electrode 21 and the second touch electrode 22 are arranged in a same layer and need to be insulated from each other, the bridge layer 23 needs to be arranged to connect the adjacent first touch electrodes 21 along the first direction X. The first sub-touch portion Z1 and the bridge portion are arranged in the same layer, and the second sub-touch portion Z2 and the touch electrode layer are arranged in the same layer. Specifically, the first sub-touch portion Z1 and the bridge portion may be formed by a same process, and the second sub-touch portion Z2 and the touch electrode layer may also be formed by a same process, both of which reduce the manufacturing costs.

Figure 13:
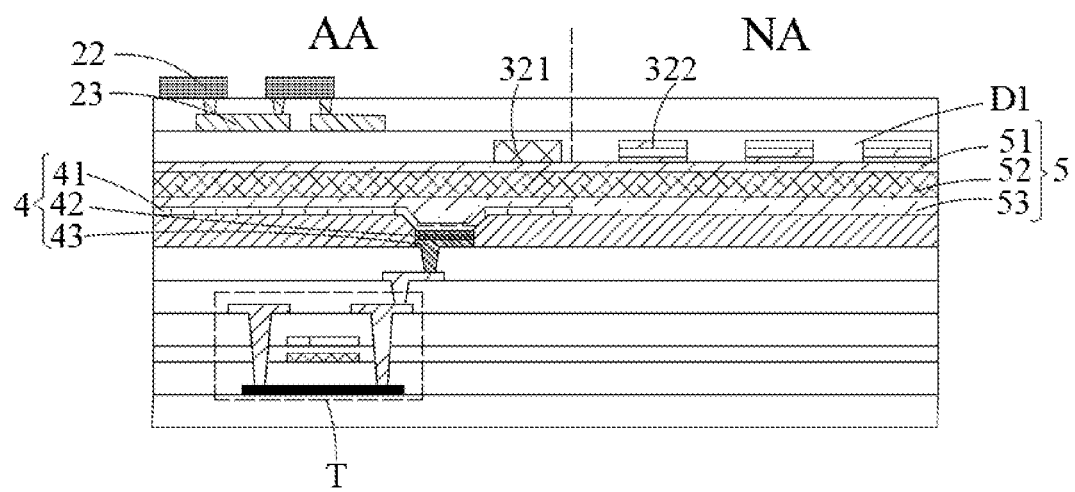
FIG. 13 is a structural view of a film layer of yet another embodiment at B-B in the FIG. 1.

Considering that the touch signal line 3 and the touch layer 2 are arranged in a same layer, problems such as the capacitive coupling exists, so the touch signal line 3 and the touch layer 2 may also be arranged in different layers. Referring to FIG. 13, which is a structural view of a film layer of yet another embodiment at B-B in the FIG. 1. Optionally, the display panel further includes a first conductive layer D1 arranged between the bridge layer 23 and the substrate 1. The touch signal line 3 and the first conductive layer D1 are arranged in a same layer.

It should be noted that the touch layer 2 includes the bridge layer 23 and the touch electrode layer that are stacked along the direction perpendicular to the plane where the substrate 1 is located, that is, the bridge layer 23 is arranged between the touch electrode layer where the first touch electrode 21 and the second touch electrode layer 22 are located and the substrate 1 an.

In this embodiment, the first touch trace 31 and the second touch trace 32 of the touch signal line 3 are arranged in the first conductive layer D1. The first conductive layer D1 is arranged between the bridge layer 23 and the substrate 1, and a distance between the first conductive layer D1 and the touch electrode layer is relatively greater, so that a risk of the capacitive coupling between the touch signal line 3 and the touch electrode layer may be effectively reduced. The touch electrodes are located on a side of the touch trace close to a light-emitting surface, which does not increase a distance from the touch electrode to a finger and does not affect sensitivity of fingerprint recognition.

In some optional embodiments, a part of the first touch trace 31 and the second touch trace 32 located in the display region AA and the touch layer 2 are formed by a same process.

It should be noted that, when a part of the first touch trace 31 and the second touch trace 32 located in the display region AA and the touch layer 2 are formed by the same process, a part of the first touch trace 31 and the second touch trace 32 located in the display region AA and the first touch electrodes 21 and the second touch electrodes 22 on the touch layer 2 may have a same structural shape; an only difference between a part of the first touch trace 31 and the second touch trace 32 located in the display region AA and the first touch electrodes 21 or the second touch electrodes 22 is a signal difference. It can be understood as replacing part of the first touch electrode 21 may be replaced with the first touch trace 31 and the second touch trace 32 or the second touch electrode 22 may be replaced with the first touch trace 31 and the second touch trace 32. The first touch trace 31 and the second touch trace 32 in the display region AA may occupy a part of space where the first touch electrode 21 or the second touch electrode 22 are originally arranged.

Optionally, a part of the first touch trace 31 and the second touch trace 32 located in the display region AA, the first touch electrodes 21 and the second touch electrodes 22 are of a metal grid structure. It can be understood that the first touch electrodes 21 and the second touch electrodes 22 are of the metal grid structure, and a structural arrangement of a part of the first touch trace 31 and the second touch trace 32 located in the display region AA is the same as a structural arrangement of the first touch electrodes 21 and the second touch electrodes 22. That is, a part of the first touch electrodes 21 or the second touch electrodes 22 is replaced with the first touch trace 31 and the second touch trace 32, and a part of the first touch trace 31 and the second touch trace 32 located in the non-display region AA still uses a normal single trace structure.

Figure 14:
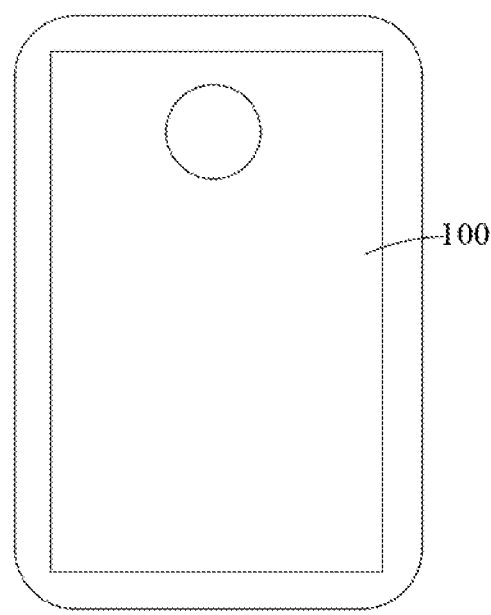
FIG. 14 is a schematic structural view of a display device according to an embodiment of the present application.

Referring to FIG. 14, an embodiment of the present invention further provides a display device 100, including: a display panel, the display panel is the display panel according to any one of the above embodiments.

The display device provided by the embodiment of the present application has technical effects of technical solutions of the display panel according any one of the above embodiments, and explanations of structures and terms that are the same as or corresponding to the above embodiments are not repeated herein.

The display device provided by the embodiment of the present application may be applied to a mobile phone, and may also be applied to any electronic product with a display function, including but not limited to the following categories: televisions, notebook computers, desktop monitors, tablet computers, digital cameras, smart rings, smart glasses, in-vehicle displays, medical equipment, industrial control equipment, touch interactive terminals, etc., which are not particularly limited in this embodiment of the present application.

The above are only specific implementations of the present application, those skilled in the art can clearly understand that the specific working processes of the above-described systems, modules and units can be referred to the corresponding processes in the foregoing method embodiments for the convenience and brevity of the description, which is not repeated here. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

It should also be noted that according to the exemplary embodiments described in the present application, some methods or systems are described based on a series of steps or apparatuses. However, the present application is not limited to the above order of the steps, that is, the steps may be executed in the order described in the embodiments or in orders different from that in the embodiments, or several steps may be executed at the same time.

What is claimed is:

1. A display panel comprising a display region and a non-display region arranged adjacently, wherein the display panel comprises:
   a substrate;
   a touch layer located in the display region and arranged on a side of the substrate, wherein the touch layer comprises one or more first touch electrodes extending along a first direction and arranged along a second direction and one or more second touch electrodes extending along the second direction and arranged along the first direction;
   a touch signal line comprising a first touch trace and a second touch trace, wherein the first touch trace is electrically connected to the first touch electrodes, and the second touch trace is electrically connected to the second touch electrodes;
   wherein at least a part of the first touch trace is located in the display region,
   wherein the first touch trace comprises a first sub-touch trace and a second sub-touch trace, the first sub-touch trace is located in the display region, and the second sub-touch trace is located in the non-display region,
   wherein the first sub-touch trace comprises one or more first trace segments located in the display region and extending along the first direction,
   wherein the display panel further comprises a light-emitting device layer comprising a plurality of light-emitting units, each of the first trace segments is located between two of the light-emitting units, and each of the first trace segments is of a zigzag shape or of a wave shape.

2. The display panel according to claim 1, wherein the second sub-touch trace comprises one or more second trace segments located in the non-display region and extending along the first direction.

3. The display panel according to claim 1, wherein at least one of the light-emitting units is arranged between adjacent first trace segments.

4. The display panel according to claim 1, wherein at least a part of the second touch trace is located in the display region.

5. The display panel according to claim 4, wherein the second touch trace comprises a third sub-touch trace and a fourth sub-touch trace, the third sub-touch trace is located in the display region, and the fourth sub-touch trace is located in the non-display region.

6. The display panel according to claim 5, wherein the third sub-touch trace comprises one or more third trace segments located in the display region and extending along the first direction, and the fourth sub-touch trace comprises one or more fourth trace segments located in the non-display region and extending along the first direction.

7. The display panel according to claim 1, wherein the first touch trace comprises one or more fifth trace segments located in the display region, and the fifth trace segments are arranged in a gap between the first touch electrodes and the second touch electrodes, so as to connect the first touch electrodes located in different rows along the second direction.

8. The display panel according to claim 6, wherein at least two third trace segments are arranged in the display region along the second direction.

9. The display panel according to claim 6, wherein along the second direction, a minimum distance from a third trace segment close to the non-display region to a third trace segment away from the non-display region is less than or equal to a width of one of the second touch electrodes along the second direction.

10. The display panel according to claim 6, wherein along the second direction, a minimum distance from a third trace segment close to the non-display region to a third trace segment away from the non-display region is less than or equal to 4 mm.

11. The display panel according to claim 1, wherein along a direction perpendicular to a plane where the substrate is located, a part of the first touch trace and the second touch trace located in the non-display region comprises a first sub-touch portion and a second sub-touch portion arranged in different layers and connected through a via.

12. The display panel according to claim 11, further comprising a first shielding block, wherein the first shielding block is arranged between the substrate and a part of the first touch trace and the second touch trace located in the display region, and an orthographic projection of the first shielding block on the substrate covers an orthographic projection of the part of the first touch trace and the second touch trace located in the display region on the substrate.

13. The display panel according to claim 11, further comprising a third sub-touch portion, the third sub-touch portion and the first sub-touch portion are arranged in a same layer, and the third sub-touch portion is electrically connected to a part of the first touch trace and the second touch trace located in the display region through a via.

14. The display panel according to claim 1, wherein along a direction parallel to a plane where the substrate is located, a second shielding block is arranged between a part of the first touch trace and the second touch trace located in the display region and an adjacent first touch electrode or an adjacent second touch electrode.

15. The display panel according to claim 14, wherein along a direction parallel to the plane where the substrate is located, a width of the second shielding block is greater than or equal to a width of a single trace of the first touch trace and the second touch trace located in the display region.

16. The display panel according to claim 11, wherein the touch layer comprises a bridge layer and a touch electrode layer stacked along a direction perpendicular to the plane where the substrate is located, and the first touch electrodes and the second touch electrodes are arranged in the touch electrode layer, and adjacent first touch electrodes along the first direction are electrically connected to each other through a bridge portion of the bridge layer;

the first sub-touch portion and the bridge portion are arranged in a same layer, and the second sub-touch portion and the touch electrode layer are arranged in a same layer; or the display panel further comprises a first conductive layer arranged between the bridge layer and the substrate, and the touch signal line and the first conductive layer are arranged in a same layer.

17. A display device comprising a display panel, wherein the display panel comprises a display region and a non-display region arranged adjacently, and the display panel comprises:

a substrate;

a touch layer located in the display region and arranged on a side of the substrate, wherein the touch layer comprises one or more first touch electrodes extending along a first direction and arranged along a second direction and one or more second touch electrodes extending along the second direction and arranged along the first direction;

a touch signal line comprising a first touch trace and a second touch trace, wherein the first touch trace is electrically connected to the first touch electrodes, and the second touch trace is electrically connected to the second touch electrodes;

wherein at least a part of the first touch trace is located in the display region, wherein the first touch trace comprises a first sub-touch trace and a second sub-touch trace, the first sub-touch trace is located in the display region, and the second sub-touch trace is located in the non-display region, wherein the first sub-touch trace comprises one or more first trace segments located in the display region and extending along the first direction, wherein the display panel further comprises a light-emitting device layer comprising a plurality of light-emitting units, each of the first trace segments is located between two of the light-emitting units, and each of the first trace segments is of a zigzag shape or of a wave shape.

* * * * *